Dec. 28, 1965   R. W. TRIPP   3,226,710
ANALOG-DIGITAL CONVERTER
Filed March 7, 1963   7 Sheets-Sheet 1
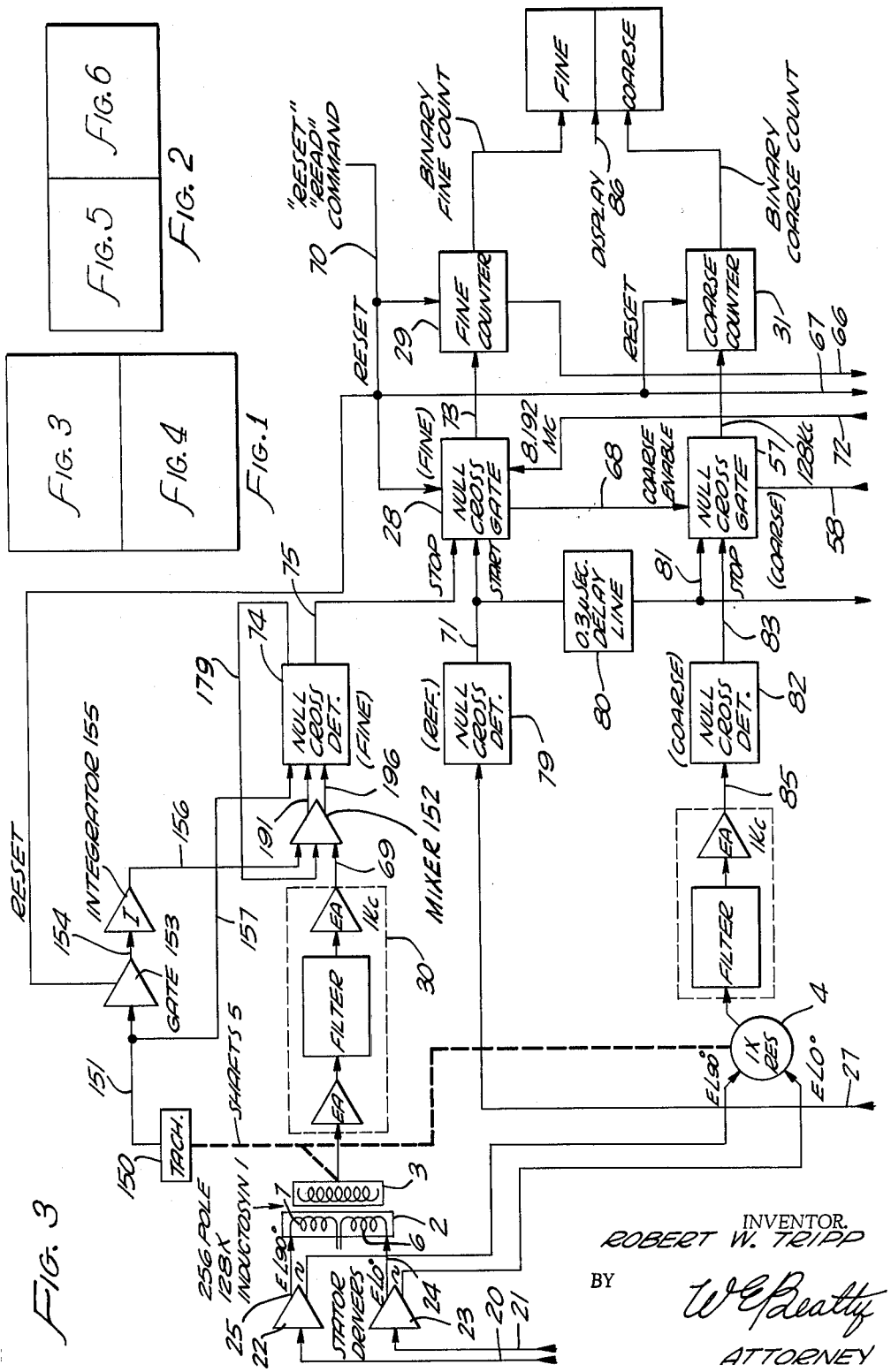
INVENTOR.
ROBERT W. TRIPP
BY
W. E. Beatty
ATTORNEY

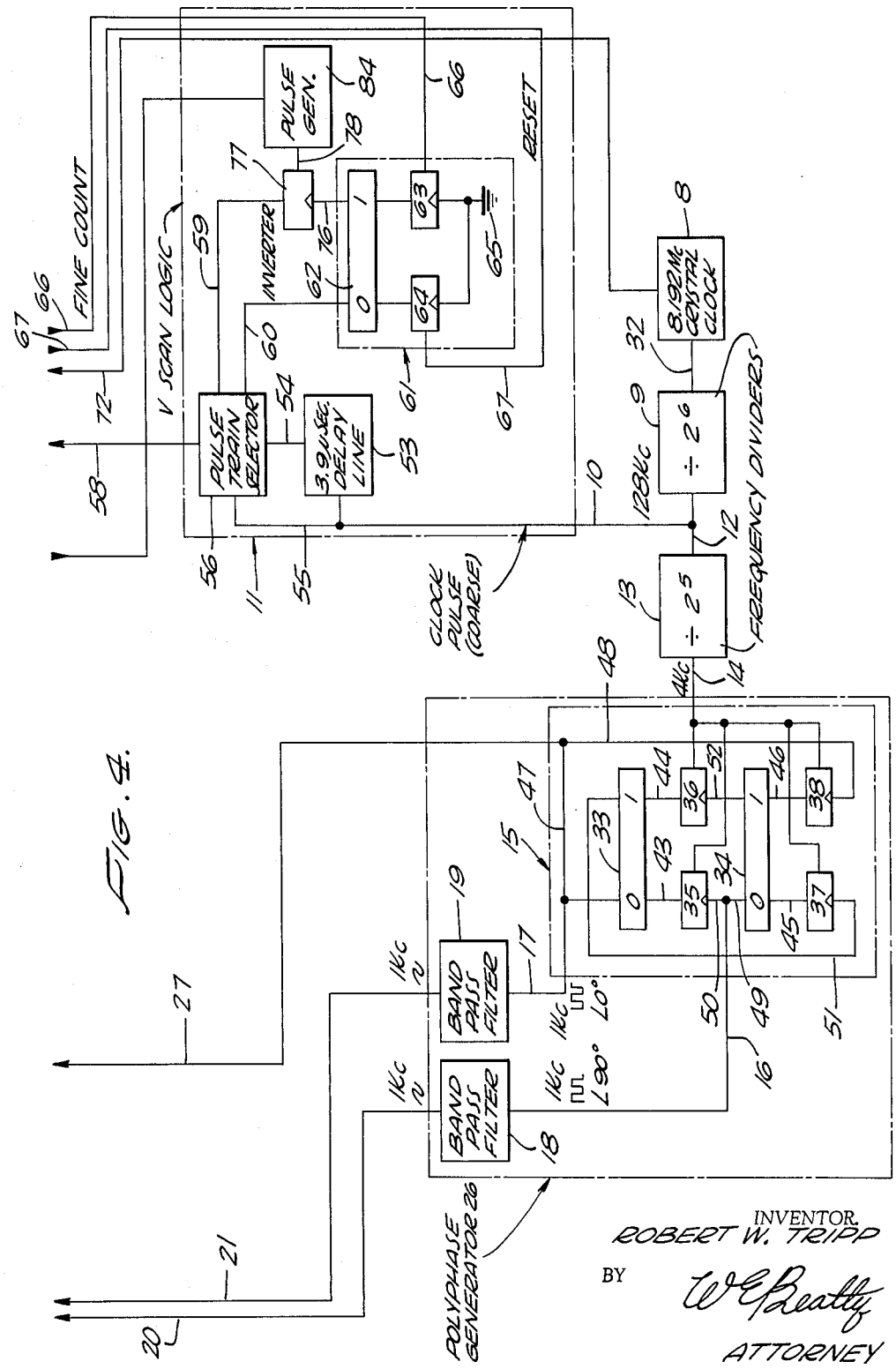

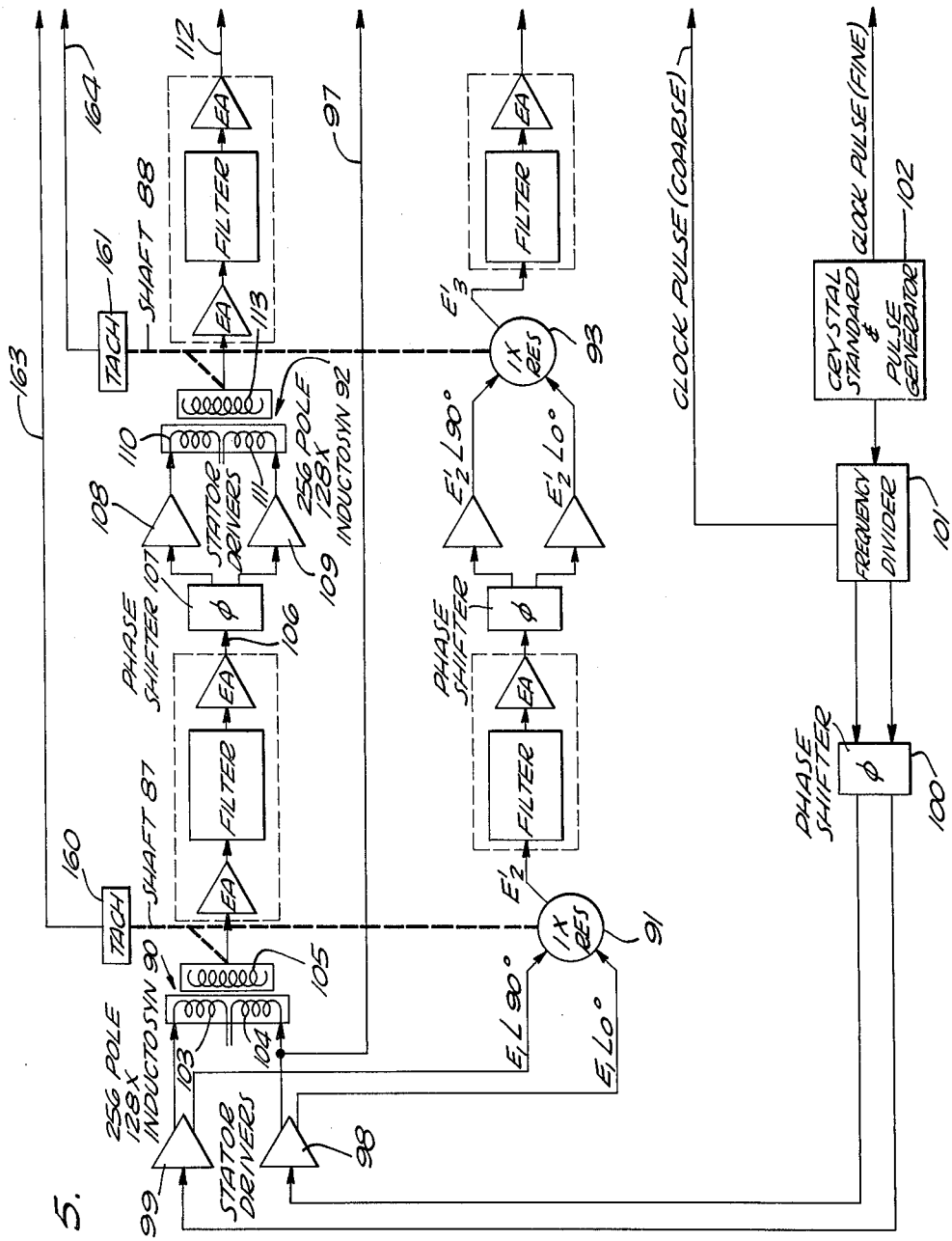

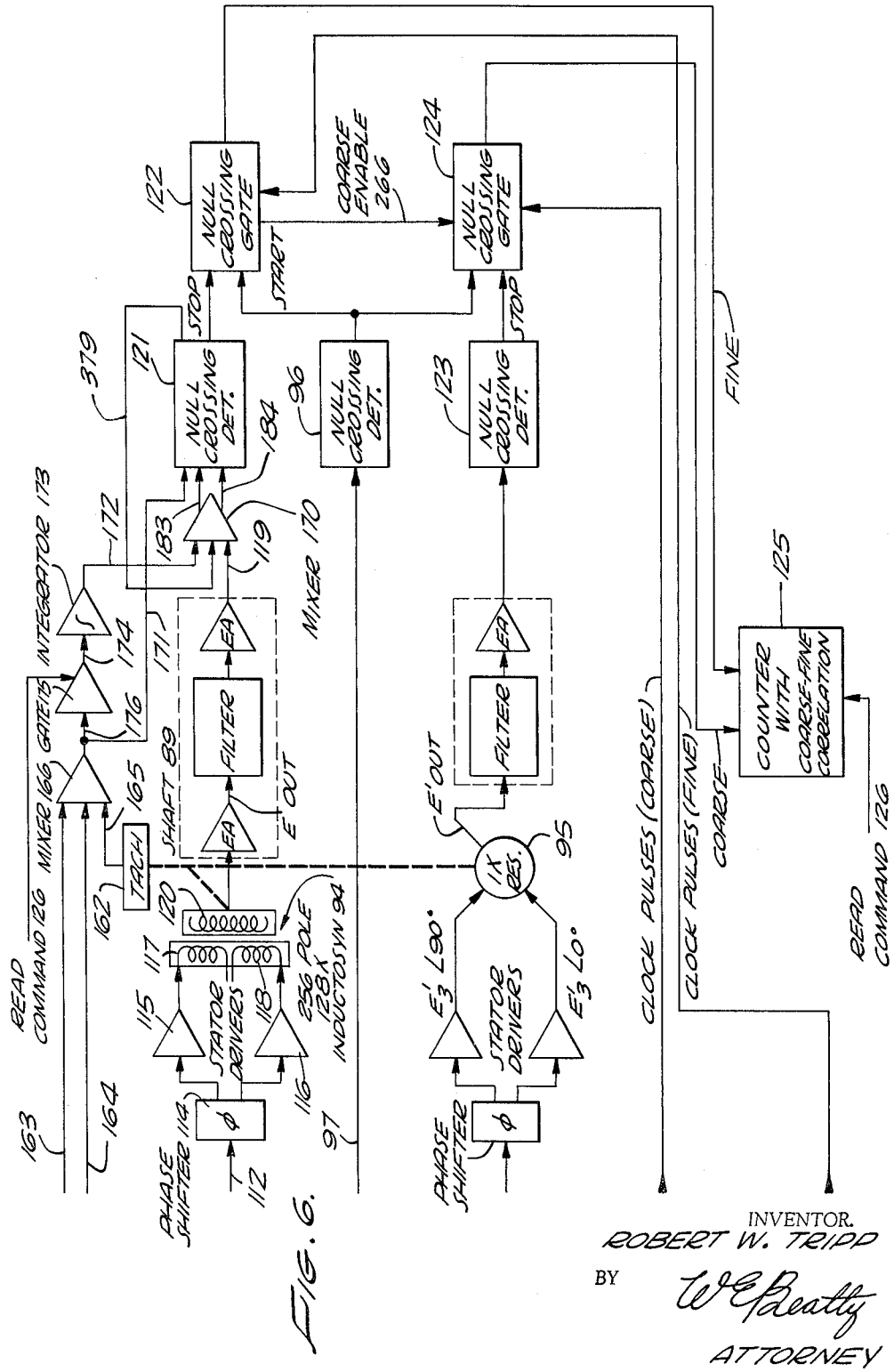

INVENTORS
ROBERT W. TRIPP
BY W.E.Beatty
ATTORNEY

INVENTOR.
ROBERT W. TRIPP

United States Patent Office 3,226,710
Patented Dec. 28, 1965

3,226,710
ANALOG-DIGITAL CONVERTER
Robert W. Tripp, Eastchester, N.Y., assignor to Inductosyn Corporation, Carson City, Nev., a corporation of Nevada
Filed Mar. 7, 1963, Ser. No. 263,586
5 Claims. (Cl. 340—347)

The present invention is an improvement in the invention disclosed and claimed in patent application S.N. 222,151 filed Sept. 7, 1962 by Robert W. Tripp, the applicant here, jointly with Robert Z. Geller, for Analog-Digital Converter. The present application discloses a number of features which are disclosed and claimed in the joint application, including the following.

(1) A converter employing coarse and fine data transmission elements in the form of position measuring transformers having relatively movable members, one of the members having polyphase windings, the other having a single phase winding. The polyphase windings constitute the input and are relatively stationary, whereas the single phase windings are relatively movable and are driven by the shaft or linear drive and provide a phase-sensitive control signal.

(2) Maintain synchronism of the phases with each other and with reference signals employed to control a null crossing detector and null crossing gates, and also employed for correlating the operation of coarse and fine counters to prevent an ambiguity in the count. This is accomplished by deriving the reference signals, as well as the polyphase inputs for the data transmission elements, from the same source which is a crystal controlled oscillator generating a clock frequency. The lower frequencies required are obtained by frequent division. The polyphase input for the data transmission elements, for example, is shown as two phases of a carrier with precisely 90 degrees of phase shift between them. This polyphase input is obtained by quadrature generation and division of the clock frequency.

By counting down from the clock pulse generator, this removes a one count uncertainty that would exist if the carrier and clock frequencies were not synchronized, and a precise phase relation is obtained between the polyphase inputs.

In the example shown, there is provided a binary system wherein a 256 pole (128 speed) rotary Industosyn[1] and a one speed resolver are mounted on a shaft whereof the shaft position is to be measured or indicated by a binary digtal number. The stator windings of the Inductosyn are energized with a polyphase one kc. sine wave source, as explained above, the Industosyn rotor having a signal or error output of constant amplitude one kc. sine wave the phase of which varies as a function of the shaft angle position. A 360° shift in phase is realized for each electrical cycle of the Inductosny. Since the Inductosyn has 256 poles, the cycle is $\frac{1}{128}$ of a revolution or $2\frac{13}{16}$ degrees of shaft rotation. For a count of $2^{20}$, the fine electrical cycle is divided into $2^{13}$ or 8,192 fine parts, the coarse resolver which defines the Inductosyn cycle, providing the additional count of $2^{7}$. With a carrier of 1 kc. the required clock pulse frequency is therefore 8.192 mc. The total number of pulses fed from the clock to the coarse and fine counters is a digital representation of the phase shift existing between a reference crossing and the error crossing of the output signals from the data transmission elements and therefore, a direct measurement of the angle of the shaft that provided the phase shift. Similar considerations apply in the case where data transmission elements have a linear instead of rotary movement, the linear form being disclosed and claimed in the joint application.

(3) Correlation of the operation of the coarse and fine counters is obtained by providing so-called "V scan logic" circuitry having a pulse train selector supplying two trains of pulses of the same frequency, derived from the clock oscillator, one an early or lead train and the other a late or lag train, the latter being phase shifted by ½ the pulse spacing or 3.9 μsec. with respect to the early train. This delay is equal to approximately ½ cycle of the coarse frequency. After any reset pulse, the pulse train selector will aways transmit the early pulse train to a coarse null crossing gate, but this gate is in an off condition and does not transmit until put in a ready condition by the fine null crossing gate after the fine counter has completed its count. At the initiation of a set read command, the fine counter is reset to zero, the fine null crossing gate accepting the next start pulse and opening to transmit the 8.192 megacycles pulses from the clock generator to the fine counter. The fine counter counts these pulses until the next stop command is received.

The operation of the coarse and fine counters is correlated by feeding to the coarse counter either the early or late pulse train, depending upon the count registered in the fine counter. This is accomplished by the V scan logic circuitry which transmits the early pulse train to the coarse counter if the fine counter has not gone over half its total possible count, and which transmits the late pulse train to the coarse counter, if the fine counter has gone over half its total possible count.

(4) Removal of the ambiguity which exists in the V scan logic circuitry below the first $2\frac{13}{16}$ degrees of shaft revolution which is equivalent to one complete Inductosyn cycle, is accomplished by providing a delay which shifts the coarse stop pulse from synchronism with either the early or late pulse train. This delay is adjusted so that the consecutive pulses of the early pulse train lie near the negative peak of the reference signal to the Inductosyn, and, therefore, the late pulses lie near the positive peak of the reference signal to the Inductosyn. Thus, the switch point of the pulse train selector in the V scan logic circuitry occurs midway between the early and late pulse train spacing.

The coarse resolver and the Industosyn are mechanically and electrically zeroed. Therefore coarse and fine error null crossings will occur approximately in synchronism, within the accuracy of the coarse resolver. However, the fine error null crossing selects a train of pulses, through V scan logic, which places the coarse stop pulse in a position so that it never can be synchronous with a pulse in the coarse early or late trains. Thus the fine counter or fine portion of the system removes the ambiguity which could possibly exist in the coarse count and automatically selects the pulse train which has the correct number of pulses for the coarse count.

In brief, the invention relates to an analog-digital converter wherein clock pulses are transmitted through a gate in an amount providing a digital representation of the angular position of a mechanical analog shaft input,

[1] Trademark.

the gate being controlled by a start signal from a reference null crossing detector and a stop signal from another null crossing detector having an input in the form of a signal having a phase depending upon the shaft position, this signal being derived from the movable member of a position measuring transformer driven by the shaft, the transformer perferably having a polyphase input derived from the clock generator.

An object of the present invention is to reduce or correct an error due to the velocity of a shaft which constitutes the mechanical analog input.

Shaft velocities in excess of 1000 arc-seconds-per-second (when using a carrier frequency of 1 kc.) will introduce errors in the readout, proportional to the shaft velocity, in excess of 1 second of arc. This error is twofold:

1.—due to frequency shift of the carrier frequency.
2.—due to asynchronous read command.

*Correction of velocity error due to frequency shift*

A phase shift is introduced in the error channel, as a function of frequency. This shift will then reflect on erroneous digital readout. However, when the phase shift vs. frequency characteristics are relatively linear over the velocity range, correction becomes rather simple. A D.-C. tachometer, coupled to the shaft in question, is used to provide a D.-C. signal proportional to shaft velocity. This signal is mixed with the error amplifier output and causes the fine null crossing detector to be biased off by an amount proportional to the phase shift due to frequency shift.

*Correction of velocity error due to asynchronous read command*

The second source of error exists when the read or interrogate command is not synchronous with the null crossing pulse used to "stop" the counter. A finite time elapses before the next stop pulse establishes the positional count. If the velocity is such that, within this time, the shaft has moved more than the resolution requirements of the system, then this digital output will not be representative of the shaft position at the exact instant of interrogation. This error is reduced as follows:

The tachometer output is fed into a gate which, having been automatically set to zero, allows passage of this signal upon receipt of the read command. The gate output is fed into an integrator. The integrator output ramp signal is then mixed along with the error signal and the straight D.-C. tachometer signal to bias the null crossing detector accordingly.

The integrator is automatically reset to zero after 1 millisecond duration, ready for the next read command.

A further object of the invention is to digitize the sum and/or difference of several shaft angles while correcting the velocity error. The invention accomplishes this while employing no more digital equipment than is required for a single shaft angle digitizing system.

The standard Inductosyn is disclosed and claimed in U.S. Patent 2,799,835, patented July 16, 1957 to R. W. Tripp et al., for Position Measuring Transformer, and in numerous other U.S. patents assigned to the same assignee. The triple Inductosyn, which may be employed for linear position digitizing, is disclosed and claimed in copending application S.N. 29,972 filed May 18, 1960 by Clair L. Farrand and Robert W. Tripp for Precision Transducers.

For further details of the invention, reference may be made to the drawings wherein FIG. 1 is a block diagram showing how FIGS. 3 and 4 fit together to make an analog-digital converter having velocity error correction according to the present invention.

FIG. 2 is a block diagram showing how FIGS. 5 and 6 fit together to form the invention applied to velocity error correction for multiple shaft encoding.

*FIGS. 3 and 4*

Figure 7:
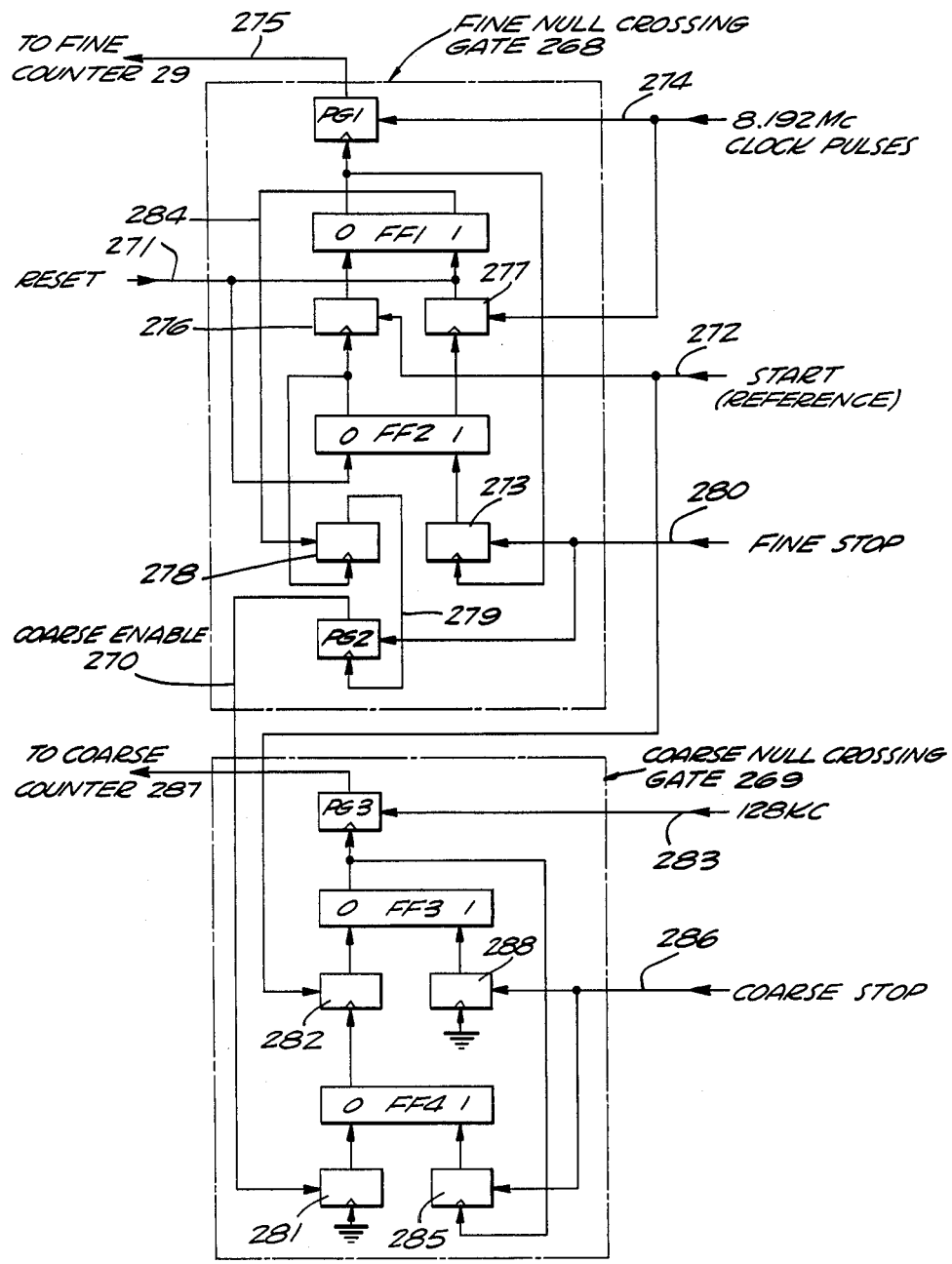
FIG. 7 is a schematic circuit of the fine and coarse null crossing gates with coarse enable for correlating the operation of the fine and coarse counters.

Referring in detail to the drawings, FIGS. 3 and 4 illustrate a binary system wherein a 256 pole, 128 speed rotary Inductosyn 1 has a stator 2 and rotor 3. The rotor 3 and the rotor of a 1 speed coarse resolver 4 are mounted on the shaft 5, indicated by broken lines. The reference number 5 identifies the shaft of which the position is to be measured or displayed as described.

The stator windings 6 and 7 of Inductosyn 1 are energized with 1 kc. voltages in quadrature time phased relation, these voltages being derived from a crystal clock generator 8 which also supplies all the basic frequencies required for system operation.

For reasons explained below, the frequency of clock 8 is 8.192 mc. Frequency divider 9 divides this frequency by $2^6$, which is the coarse clock pulse being supplied by line 10 to the V scan logic circuitry 11, and also by line 12 to frequency divider 13 for a further division by $2^5$, the output of 4 kc. as indicated being supplied by line 14 to the frequency divider and quadrature generator 15 having 1 kc. square wave outputs on lines 16 and 17, one of the outputs being shifted in time phase 90° relative to the other. The vloatges in lines 16 and 17 are supplied to band pass filters 18 and 19 which supply their output to lines 20 and 21 and which lead to the stator driver amplifiers 22 and 23. The frequency divider and quadrature generator 15 and band pass filters 18 and 19 constitute a polyphase generator indicated at 26 for the polyphase voltages on lines 20 and 21, and for the 1 kc. square wave coarse reference signal on line 27. Driver 23 has an output on line 24 to stator winding 6, and driver 22 has an output on line 25 to stator winding 7.

The signal or error output from the Inductosyn rotor 3 is a constant amplitude one kilocycle sine wave the phase of which varies as a function of the angles of shaft 5. As a result, a 360° shift in phase is realized for each electrical cycle of the Inductosyn 1. Since the Inductosyn 1 has 256 poles, the cycle is $1/128$ of a revolution or $2^{13}\%_{16}$ degrees of shaft 5 rotation. For a total count of $2^{20}$ the electrical cycle is divided into $2^{13}$ or 8.192 mc. parts. The coarse resolver 4 will define the Inductosyn cycle thereby providing the additional count of $2^7$. With a carrier frequency of 1 kc., the required clock pulse frequency is therefore 8.192 mc. The 1 kc. carrier is derived by counting down from the clock pulse generator 8 as explained above. This removes a one count uncertainty that would exist if the carrier and clock frequencies were not synchronized. It also provides a convenient means for obtaining two phases of a highly stable carrier with precisely 90° of phase shift between them.

Positive going null crossings of the 0° reference square wave on line 27 open the fine null crossing gate 28, allowing pulses from the clock pulse generator to be fed to the fine counter 29. The null crossing gate 28 is closed by positive going null crossings of the Inductosyn output signal from rotor 3 in line 69, after transmission through the amplifiers and filter indicated by block 30, thus blocking clock pulses to the fine counter 29.

The total number of fine pulses fed from the clock 8 to the counter 29 is therefore a digital representation of the phase shift existing between the square wave reference crossing in line 27 and the positive error crossing of the output signal in line 69 and, hence, the pulse count is a direct measurement of the angle of the shaft 5 that provides the phase shift.

The same procedure applies to the 1 speed resolver 4 provided for coarse digital data consisting of the 128 kc. pulses in line 10 which are counted by the coarse counter 31.

The 1 speed resolver 4 is operated exactly in the same fashion as the circuit of Inductosyn 1 described above, taking full consideration of the fact that this 1 speed circuit counts parts of one revolution (360°), whereas the Inductosyn counts parts of $\frac{1}{128}$ of a revolution ($2^{13}\!\!\!/_{16}$ degrees). The frequency of operation of the coarse or 1 speed section of the counter is 128 kc., and is obtained by frequency division in the same method as fine, as explained above.

*Digital system operation excepting velocity error correction*

Referring to FIGS. 3 and 4, system digital operation is as follows: using the 256 pole rotary Inductosyn, with 1 kc. excitation and a clock frequency of 8.192 megacycles, a total count of $2^{20}$ for each 360° of shaft rotation will result. This will consist of a count of $2^{13}$ in fine and a count of $2^7$ for the course resolver 4. The data output will be in a parallel binary form. The 1 kc. stator excitation lines 20 and 21 and the 128 kc. coarse clock frequency lines 10 and 12 are obtained by frequency division of the 8.192 mc. crystal controlled clock 8 on the diagram. The 8.192 mc. pulses are fed via line 32 to the first divider 9. Divider 9 contains six flip flops which divide the 8.192 mc. by $2^6$ or 64. The output of this divider in lines 10 and 12 is a pulse train with a frequency of 128 kc. The 128 kc. train is fed to the second frequency divider 13 via line 12 and to the V scan logic circuitry 11 via line 10. The second divider 13 contains five flip flops, these flip flops divide the 128 kc. train by $2^5$ or 32. The output of divider 13 in line 14 is therefore a pulse train at a frequency of 4 kc. This 4 kc. pulse train is fed via line 14 to the frequency divider and quadrature generator 15. The quadrature generator and divider 15 contains two flip flops 33 and 34 and four pulse inverters 35, 36, 37, and 38. The 4 kc. output of divider 13 is applied simultaneously to the inputs of the four pulse inverters 35—38 via lines 39, 40, 41, and 42. The pulse inverters 35-38 will not pass a pulse unless their gate inputs, as indicated by the small triangles on each inverter, are at ground. The two flip flops 33 and 34 provide a ground at their 0 or 1 terminals when they are in the 0 or 1 state. If flip flop 33 is in the 0 state then its 0 output terminal is at ground and its 1 terminal is at —4 volts. The same logic applies to flip flop 34. The output of the pulse inverters 35-38 is applied to the flip flop inputs via lines 43, 44, 45, and 46. It a pulse is applied to the 0 input of a flip flop and it is in the zero state it will not transfer, however, if it is in the 1 state it will transfer. Having defined operation of the individual components of the frequency divider and quadrature generator 15, quadrature generation and division proceed as follows.

Assume both flip flops 33 and 34 to be in the zero state. Therefore, their 0 output terminals are at ground. The ground of flip flop 33 is applied via lines 47, 48 to pulse inverter 38 and from flip flop 34 via lines 49, 50 to pulse inverter 35. Likewise the flip flop 33 terminals are at —4 volts. The —4 volt levels are applied to pulse inverters 36 and 37 via lines 51 and 52. Under this condition, pulse inverters 35 and 38 will transmit the first pulse of the 4 kc. train which appears at their inputs. Since flip flop 33 is in the zero state, it will ignore this pulse. However, flip flop 34 will transfer to the 1 state since it is receiving a transfer pulse on the 1 side and is in the zero state. On the second 4 kc. pulse, flip flop 33 is still in the zero state and flip flop 34 is now in the 1 state. Grounds therefore appear on pulse inverter gates 36 and 38. Therefore, pulse inverters 36 and 38 now transmit the second pulse to the 1 inputs of the flip flops 33, 34. Since flip flop 33 is in the zero state it transfers, and since flip flop 34 is in the 1 state it does not transfer. Now both flip flops 33, 34 are in the 1 state. Grounds therefore appear at pulse inverters 36 and 37. On the third pulse of the 4 kc. train, flip flop 34 transfers and flip flop 33 does not. Now flip flop 33 is in the 1 state and flip flop 34 is in the zero state. Grounds now appear at pulse inverters 35 and 37. On the 4th pulse of the 4 kc. train, flip flop 33 transfers and 34 does not. Now both flip flops 33, 34 are in the zero state and we are back at the starting condition. Regardless of the state of the flip flops 33, 34 at the start of a count, they will return to this state within 4 pulses of the applied frequency, therefore a scale of 4 is developed and if the input frequency is 4 kc. the output frequency will be 1 kc. Since the flips flops 33, 34 transfer alternately at every pulse of the 4 kc. train, their 0 to 1 output terminals are always precisely 90° phase shifted with respect to each other and are always in synchronism with the applied frequency. Thus the outputs of polyphase generator 26 on lines 20 and 21 are quadrature 1 kc. square waves. The harmonics in the square waves from quadrature generator 15 are filtered out by filters 18 and 19 and the filter outputs on lines 20 and 21 are sine waves with the same time phase characteristics of the input square waves; that is 90°. The quadrature sine waves are fed via lines 20 and 21 to the stator driver amplifiers 22, 23.

*V scan logic circuitry*

The V scan logic circuitry provides two trains of pulses of the same frequency which are used in coarse-fine data correlation. These pulse trains will be referred to as the early or lead train and the late or lag train. The late train is phase shifted by ½ the pulse spacing or 3.9 μsec. with respect to the early train. This spacing is accomplished by the use of delay line 53 whose input is the early train line 55 and whose output is the late train line 54. The delay is equal to approximately ½ cycle of the coarse frequency which is 3.9 μsec., $$\left(\text{½ cycle} = \frac{1}{256{,}000} \text{ sec.}\right)$$

Both the early and late trains lines 55 and 54 are fed to the pulse train selector 56 which transmits either the early or late train to the coarse null crossing gate 57 in FIG. 3 via line 58. The output of the pulse train selector 56 is controlled by the voltage which appears on lines 59 and 60 at the input of pulse train selector 56. A minus 4 volt level on line 60 will block transmission of the early pulse train on line 55 through the pulse train selector 56. Likewise, a minus 4 volt level on line 59 will block transmission of the late pulse train on line 54. When a ground potential occurs at either line 59 or 60 the pulse train selector 56 will transmit pulses on that side which sees the ground. In this way, either the early or the late train is transmitted via the train selector 56 through line 58 to the coarse null crossing gate 57. The zero or minus 4 volt level for lines 59 and 60 are supplied by the flip flop circuitry 61 in FIG. 4. Depending on the state of the flip flop 62, the zero or one terminals will have ground or minus 4 volts at their outputs. The flip flop state is controlled by the pulse inverters 63 and 64 in circuit 61. The pulse inverters 63 and 64 have their gate inputs returned to ground 65 and therefore can accept pulses on either line 66 or line 67 and transmit these pulses to control the state of the flip flop 62. At the beginning of a reading, a pulse appears on line 67 due to the reset start pulse. This pulse is transmitted by inverter 64 and resets the flip flop 62 to the zero state, thereby providing a ground at the zero output terminal of 62. This ground is transmitted via line 60 to the early pulse train gate input of the pulse train selector 56. This sets the pulse train selector 56 in a state wherein it will transmit the early pulse train. After any reset pulse on line 67, the pulse train selector 56 will always be transmitting the early pulse train to the coarse null crossing gate 57. However, this gate 57 is in an off condition and the coarse counter 31 does not register. The coarse null crossing gate 57 is put in a ready condition by the coarse enable line 68. The coarse enable control in line 68 is derived from the fine null crossing gate 28. After the fine counter 29 has completed its count, a pulse is transmitted via line 68 to the coarse null crossing gate 57 enabling it to accept the next start pulse and start the coarse count. Line 66 connects the output of the fine counter 29 to inverter 63. At the initiation of a reset read command signal on line 70, FIG. 3, the fine counter 29 is reset to zero and the fine null crossing gate 28 is put in a state where it will accept the next start pulse line 71 from null crossing detector 79. The fine null crossing gate 28 is thus opened and the 8.192 megacycles pulses from the crystal clock 8 are transmittted via line 72 through the fine null crossing gate 28 and thence via line 73 to the fine counter 29. The fine counter 29 indexes these pulses until the next stop command is received. This stop command is derived from the fine null crossing detector 74 via line 75. This stops the fine counter 29. If the fine counter 29 goes over half its total count, a level is derived from line 66 to inverter 63 which sets flip flop 62 in the one state. This level is transmitted via line 76 to inverter gate 77. Inverter gate 77 is in the conducting state since its input line 78 is at a minus voltage. This level is transmitted via line 59 to the late input side of pulse train selector 56. Therefore, the pulse train selector 56 transmits the late train of pulses to the coarse null crossing gate 57. At the next null crossing of the 1 kc. reference wave, a pulse is derived from the reference null crossing detector 79 and is fed via line 71 through delay line 80 and line 81 to the coarse null crossing gate 57. This opens the coarse gate 57 and allows the late pulse train to flow through the null crossing gate 57 via line 81 to the coarse counter 31. At the next coarse error null crossing in line 27, a pulse is produced by the coarse null crossing detector 82 which is applied via line 83 to the coarse null crossing gate 57. This closes the coarse null crossing gate 57, thus blocking flow of coarse pulses to the coarse counter 31. At this point, the fine and coarse counts are now locked up in their respective counters 29 and 31. These counters will retain this information until another read set command is applied via line 70. If the fine counter 29 had not gone over half its total possible count, no pulse would have appeared at line 66 and flip flop 62 would have remained in the zero state where it had been set by the reset command line 70. In this state, a ground from 65 would appear at the zero terminal of flip flop 62 and would have been transmitted via line 60 to the early gate input side of the pulse train selector 56. Under this condition, the early pulse train would have been fed to the coarse counter 31. Thus, depending upon the count registered in the fine counter 29, either the early or late pulse train is selected to be fed to the coarse counter 31. At each start pulse in line 71 a pulse is generated by the pulse generator 84 which is of a width sufficient to remove the first pulse of the lag train by gating off pulse inverter 77. This is necessary to remove the ambiguity which exists in the V scan logic circuitry below the first two and $1^{3}/_{16}$ degrees of shaft revolution. ($2^{13}/_{16}$ degrees is equivalent to 1 complete Inductosyn cycle.) Delay line 80 is provided to shift the coarse stop pulse in line 71 from synchronism with either the early or late pulse train. By adjusting the amount of this delay, the early pulse train is so arranged that consecutive pulses lie near the negative peak of the reference signal to the Inductosyn and therefore the late pulses lie near the positive peak of the reference signal to the Inductosyn. Thus the V scan switch point occurs midway between the early and late pulse train spacing. The coarse resolver 4 and the Inductosyn 1 are mechanically and electrically zeroed. Therefore, coarse and fine error null crossings will occur approximately in synchronism, wítihn the accuracy of the coarse resolver 4. However, the fine error null crossing selects a train of pulses, through the V scan logic circuitry 11 which places the coarse stop pulse in a position so that it never can be synchronous with a pulse in the coarse early or late trains. Thus, the fine counter 29 or fine portion of the system removes the ambiguity which could possible exist in the coarse count and automatically selects the pulse train which has the correct number of pulses for the coarse count. The coarse resolver 4 must have an accuracy sufficient to insure that the coarse stop pulse will lie within the V scan switch points. Since the V scan switch points occur essentially at the half way point in the Inductosyn cycle, it is evident that the coarse resolver need only be accurate to one half of a complete Inductosyn cycle.

*FIG. 7. Coarse enable*

FIG. 7 is a schematic circuit drawing of the fine null crossing gate 268 like 28 in FIG. 3, the coarse null crossing gate 269 like 57 in FIG. 3 and the coarse enable control 270 which is schematically indicated by the following, line 68, FIG. 3; 266 FIG. 6.

The fine gate 268 includes flip flops FF1 and FF2 and gate 269 includes flip flops FF3 and FF4. Fine gate 268 also includes pulse gates PG1 and PG2, also pulse inverters as indicated. Coarse gate 269 also includes pulse gate PG3 and pulse inverters as indicated.

When a flip-flop is in the one state, its one terminal is at ground and its zero terminal is at —4 volts. When it is in the zero state, its zero terminal is at ground and its one terminal is at —4 volts.

An inverter like 273, and 276 to 278, 281, 282, behaves very much like a pulse gate. A ground at the inverter enables the inverter to invert a level of ground or —4 volts at its input terminal.

The reset pulse on line 271 which corresponds to line 70, FIG. 3, sets FF1 in the one state and FF2 in the zero state, thereby placing a ground which appears at the flip flop output terminals at the one terminal of FF1 and a ground at the zero terminal of FF2. The next start pulse from line 272 transmitted through inverter 276 to the zero side of FF1 sets it in a zero state, thereby allowing clock pulses from line 274 to flow via pulse gate PG1 to the fine counter via line 275. This is due to the fact that the zero terminal of FF1 transferred to ground on receipt of the start pulse, line 272, via inverter 276 to zero terminal of FF1. The ground which thus appears at the zero terminal of FF1 enables pulse gate PG1 to transmit clock pulses from line 274 to the fine counter 29, FIG. 3.

A pulse gate inhibits the flow of pulses when its gate terminal is at —4 volts and transmits pulses when its gate terminal is at ground. Actually, the pulse gate contains a transistor whose emitter is connected to the gate input terminal. The —4 volt level at the emitter shuts the transistor off and the ground turns it on.

The ground at the zero terminal of FF1 is transmitted to the inverter 273. This enables the next fine stop pulse, line 280, to set FF2 in the one state and provide a ground at its one output terminal. The ground at the one output terminal of FF2 is transmitted to the inverter 277. This enables the next clock pulse after the fine stop pulse to transfer FF1 to the ground state, thereby providing a —4 volt signal at its zero terminal, closing the pulse gate PG1 for the fine counter.

During the fine counting interval, the one terminal of FF1 was at —4 volts. This —4 volt level at the one terminal of FF1, via line 284, is inverted to ground by the inverter 278. This ground is transmitted to pulse gate PG2 via line 279. PG2 is thereby enabled to transfer the fine stop pulse, line 280, before transferral of FF1. The output of PG2, which is the fine stop pulse from line 280, is labeled coarse enable 270, and sets FF4 in the zero state via the inverter 281.

The next start pulse from line 272 is transferred via inverter 282 to FF3 zero terminal, thereby setting FF3 in the zero state and thus enabling PG3 to transmit the 128 kc. pulse train, line 283, to the coarse counter 287. The ground at FF3 zero terminal is transmitted to inverter 285. This enables the next coarse stop pulse, line 286, to set FF3 and FF4 in the one state, thereby stopping the flow of pulses to the coarse counter, completing this cycle.

During the wait period between reset commands, line 271, flip flops FF3 and FF4 remain in the one state, thereby prohibiting start or stop pulses from initiating a coarse count. Also, FF1 and FF2 remain in the one state, thereby prohibiting a fine count. Thus, to enable the coarse gate 269, it is necessary that a reset command, line 271, initiate a count and the state of FF1 enable PG2 to pass a fine stop pulse, line 280.

Inverter 288 inverts the negative stop pulse on line 286 to a positive pulse. This latter pulse transfers FF3 to the 1 state, thereby stopping the coarse count.

All of the flip flops FF1 to FF4 have two input terminals and two output terminals. However, the logic does not always require the use of all terminals, although they are available. FF3 and FF4 have output terminals on the one side that are not needed to perform the required function.

The Harvey Wells equipment used here and those of most manufacturers of digital logic equipment presently use transistor circuitry to perform the logic functions of vacuum tube bistable circuits represented by the flip flops FF1 to FF4.

It will be understood that both MC. and mc. represent megacycles or one million cycles per second.

It should be noted that "ground" and —4 volts are logic levels of a particular supplier of digital equipment. Other digital systems using different logic levels can be used to supply the same function.

Velocity error correction FIGS. 3 and 4

When position measurements are made of a moving object, an error is incurred which has been called a velocity error. An increase in velocity of the object results in a decrease in the number of counts between the reference position and the object position. It is an object of this invention to compensate for this error.

A phase shift is introduced in the error channel, as a function of frequency. This shift will then reflect an erroneous digital readout. However, when the phase shift vs. frequency characteristics are relatively linear over the velocity range, correction becomes rather simple. A D.-C. tachometer 150, coupled to shaft 5, is used to provide a D.-C. signal proportional to shaft velocity line 151. This signal in line 151 is an input in line 157 to null crossing detector 74 having an output in line 179 which is mixed in mixer 152 with the error in output line 69 from amplifier 30 and causes the fine null crossing detector 74 to be biased off by an amount proportional to the phase shift due to frequency shift.

The second source of error exists when the read or interrogate command is not synchronous with the null crossing pulse used to stop the counter. A finite time elapses before the next stop pulse establishes the positional count. If the velocity is such that within this time the shaft has moved more than the resolution requirements of the system, then this digital output will not be representative of the shaft position at the exact instant of interrogation. This error is reduced as follows:

The output of tachometer 150 is fed via line 151 into a gate 153 which allows passage of this signal upon receipt of the read command, line 70. The gate output voltage line 154 is fed into an integrator 155. The integrator output ramp signal, line 156, is then mixed in mixer 152 along with the error signal, line 69, and the straight D.-C. tachometer signal, line 157 which produces a corresponding signal in line 179 to bias the null crossing detector 74 accordingly.

The integrator 155 is automatically reset to zero after 1 millisecond duration, ready for the next read command.

Shaft position readout

A shaft position is obtained in the following manner.

The reference square wave line 27, the error sine wave from the Inductosyn line 29 and the error sine wave from the resolver line 85 are always present at the respective null crossing detectors 79, 74, and 82 whenever excitation is being fed to the stator drivers 22, 23. Each time a null crossing occurs, a pulse is derived from the null crossing detectors 79, 74, and 82. The null crossing gates 28 and 57 are set in a state such that they do not accept the start pulses in line 71 or the stop pulses in lines 75 and 83 until a read command in line 70 is provided which puts them in the correct state. The null crossing gates 28 and 57 consist of flip flops with pulse inverters connected in such a manner that upon receiving a read command in line 70, the fine null crossing gate 28 will accept the next start pulse in line 71. At this start pulse, 8.192 megacycles pulses from the crystal clock 8 are transmitted via line 72 to the fine null crossing gate 28 and then via line 73 to the fine counter 29. The next fine stop pulse in line 75 derived from the Inductosyn error channel via line 69 and the fine null crossing detector 74 closes this gate and stops the fine counter. At the same time, this stop pulse in line 75 enables the coarse null crossing gate 57 via line 68 to accept the next delayed start pulse in line 81 from the reference square wave null crossing detector 79. This pulse in line 81 opens the coarse null crossing gate 57 allowing the appropriate pulse train in line 58 to be transmitted via line 81 to the coarse counter 31. The appropriate pulse in line 58 is either an early pulse train of 128 kc. from the input line 55 or a late train of pulses of the same frequency from the input line 54. The next coarse error null crossing in line 85 generates a stop pulse in the coarse null crossing detector 82 which is applied via line 83 to the coarse null crossing gate 57, thus blocking pulses to the coarse counter 31. This completes the count. Upon completion of the coarse count, the system is returned to the off state and will retain the count until a new read set command in line 70 is initiated. During the time interval between the last fine stop pulse and the next coarse start pulse the count in the fine counter 29 is applied via line 66 to the V scan logic circuitry portion 11 of the system as described previously. The fine counter 29 and the coarse counter 31 in FIG. 3 contain an appropriate number of flip flops to accumulate the fine coarse counts. The fine counter 29 must be capable of a total count of $2^{13}$ and therefore 13 flip flops are required for the fine count. When all 13 flip flops have transferred, the count is equal to one less than a full fine count. On the arrival of one more count in fine, all 13 of the flip flops will reset to zero, thereby providing a full count of $2^{13}$ or zero. Likewise, in the coarse counter 31, flip flops are provided for a count of $2^7$ or 128. When all 7 flip flops have gone to the one state, this is a count of one less than a total coarse count. One more pulse will reset all the flip flops to the zero state and again indicate zero or a full coarse count.

The binary output of the coarse and fine counters 29, 31 can be presented in a visual form if desired, as indicated at 86, or they can be used to drive a computer or similar equipment. Serial data output can be obtained by the addition of a shift register which is not shown on the block diagram.

Tabulation

The digital portion of the system is made up of standard commercially available logic packages. The units described in this system are those manufactured by Harvey Wells Electronics, Natick, Massachusetts. The following tabulation refers to these units by the reference numbers as indicated in FIGS. 3 and 4 and the published reference equivalent in the Harvey Wells 1961 catalog.

| Units | Reference Number | Harvey Wells Catalog Description | Havery Wells Catalog Model & No. Req. |
|---|---|---|---|
| Frequency Dividers | 9 | 4 stage Counter 19MC | 1-1032 |
| | | 4 stage Counter 5MC | 1-1031 |
| Frequency Dividers | 13 | 4 stage Counter 1MC | 2-103 |
| Quadrature Generator | 15 | Flip Flop B | 2-1011 |
| Crystal Clock | 8 | Crystal Clock | 1-1412 |
| | | Flip Flop B 10MC | 2-1012 |
| Null Crossing Gates | 28, 57 | Flip Flop B 5MC | 2-1011 |
| | | Pulse Gate | 2-1101 |
| Fine Counter | 29 | 4 stage binary Counter | 1-1032 |
| Coarse Counter | 31 | 4 stage binary Counter | 2-103 |
| Null Crossing Detectors | 79, 74, 82 | Pulse Standardizer | 3-1612 |
| Delay Line | 53 | Delay C | 1-1321 |
| Pulse Train Selector | 56 | Pulse Mixer | 1-1121 |
| Pulse Generator | 84 | Logic A | 1-1201 |
| Flip Flop | 33, 34, 62 | Flip Flop B | 3-1011 |
| Inverter | 35 to 38, 63, 64, 77 | Logic A | 7-1201 |

FIGS. 5 and 6

Referring to FIGS. 5 and 6, the circuits of FIGS. 3 and 4 are extended to encode the sum or difference of the angular shaft positions of a plurality of shafts. This is illustrated as applied to three shafts, 87 and 88 in FIG. 5 and 89 in FIG. 6. Each of these shafts has a rotor like 105 of a one hundred twenty-eight speed Inductosyn 90, and the like rotor of a one speed coarse resolver like 91, which are shown for shaft 87.

The Inductosyn 92 and coarse resolver 93 are provided for shaft 88 in FIG. 5, and Inductosyn 94 and coarse resolver 95 are provided for shaft 89, in FIG. 6.

In FIGS. 5 and 6, the reference voltage for null crossing detector 96 as indicated by line 97, is taken from the 0° line at the output of the stator driver 98. The stator drivers 98 and 99 as previously described in connection with FIGS. 3 and 4, are driven by a phase shifter 100 having an input from a frequency divider 101, having an input from a crystal standard pulse generator 102. Phase shifter 100 can be a quadrature generator, like 15. The input to the stator drivers 98 and 99 is composed of square waves having a quadrature separation and the output of these drivers is applied to stator windings 103 and 104 which correspond to windings 6 and 7 in FIG. 3. The signal or error output from the rotor 105 of Inductosyn 90 appears in line 106 and is a constant amplitude one kilocycle sine wave, the phase of which varies as a function of the angular position of shaft 87, as described in connection with FIG. 3.

This signal in line 106 is an input to a phase shifter 107 which shifts its input into quadrature components which form inputs to the stator drivers 108 and 109 which supply inputs to the stator windings 110 and 111 of Inductosyn 92. The error signal in the rotor output line 112 from the rotor 113 for shaft 88 thus represents the sum or difference of the angular positions of shafts 87 and 88.

The signal in line 112 is similarly an input to a phase shifter 114, FIG. 6, which divides its input into quadrature components which form inputs for the stator drivers 115 and 116, the latter providing inputs to the stator windings 117 and 118 of Inductosyn 94. Thus, the error signal in line 119 from the output of the rotor 120 of Inductosyn 94 represents the sum or difference of the angular positions of the three shafts 87, 88, and 89. From this point the operation is the same as described in connection with FIGS. 3 and 4, a start signal being derived from the null crossing detector 96, and a fine stop signal being derived from the null crossing detector 121 for controlling the fine null crossing gate 122. The stop signal from the coarse null crossing detector 123 and the start signal from the reference detector 96 are inputs to the coarse null crossing gate 124. The operation of the fine gate 122 and the coarse gate 124 are correlated and operate a counter 125 under control of a read command 126, as explained in connection with FIGS. 3 and 4.

In order to correct for the velocity error of shafts 87, 88 and 89, the error correction apparatus of FIGS. 3 and 4 is employed. Accordingly, shafts 87, 88 and 89 are provided with tachometers 160, 161 and 162 respectively.

The outputs lines 163, 164 and 165 respectively, from these tachometers provide inputs to mixer 166. Mixer 170 in FIG. 6 corresponds to mixer 152 in FIG. 3, and similarly, mixer 170 has the following inputs:

(a) error signal in line 119 and having a phase representing the position of rotor 120;

(b) an input in line 379 from the output of null crossing detector 121 having an input in line 171 from the output of mixer 166 and having a signal corresponding to the combined outputs of tachometers 160, 161, 162, representing a voltage whose phase shift is the algebraic sum of the phase shift of the three shafts 87, 88, 89 and (c) an input in line 172 as the output from integrator 173 having an input in line 174 from gate 175. Gate 175 is controlled by the read command 126 and has an input in line 176 from mixer 166.

Both types of velocity errors are corrected by the circuit in FIGS. 3 and 4, and also by the circuit in FIGS. 5 and 6.

VELOCITY CORRECTION

FIGURE 8

While the following description is directed particularly to integrator 155 and associated elements of FIG. 3, it applies equally to integrator 173 and associated elements of FIG. 6.

A finite amount of time is required to obtain a digital readout. When the analog data element, shaft 5, is stationary, the time required to take a reading has no effect on the accuracy of the reading. However, when the analog data element 5 is moving, and a readout is required that is correct at a particular time, such as the precise time at which a read command is given, then readout errors can occur.

These errors are proportional to the product of the velocity of the data element 5, and the time elapsed between the read command signal and the appropriate null crossing of the output signal of the data element. For example, if a shaft were moving at 10,000 seconds of arc per second, and the time between a read command and the appropriate null crossing of the output signal was .001 second, then the readout would be in error by 10 seconds of arc.

This error can be eliminated by obtaining a signal proportional to the product of velocity and time, and using it to compensate for the error that would otherwise be introduced.

The tachometer 150 associated with the moving member 5 provides a D.C. voltage proportional to the velocity of the moving member. This voltage in line 151 is one input to the gated integrator 177, see FIG. 8, which includes gate 153 and integrator 155, FIG. 3. The second input to the gated integrator 177 is the read command signal line 70. The D.C. voltage from the tachometer 150 is inhibited by a transitor 153 acting as a gate, and is applied to the integrator 155 only at a read command in line 70. This integrator 155 is quiescently set at the mid-point of its linear dynamic range and is able to swing positively or negatively depending upon the input signal. The gate 153 duration is arbitrarily set for a time greater than one cycle.

Figure 8:
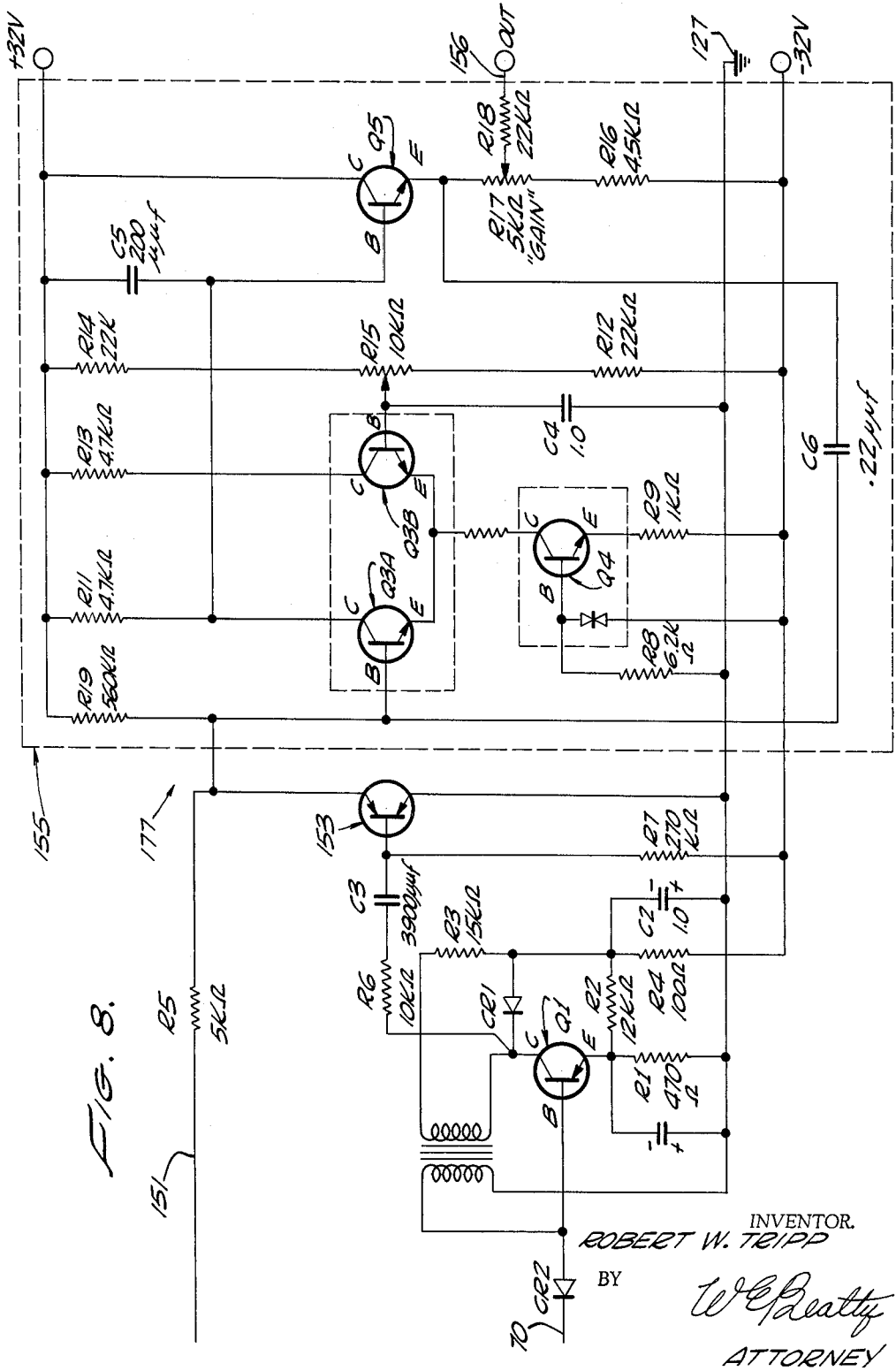
FIG. 8 is a schematic diagram of the gated integrator of the FIGS. 3 and 6.

The basic integrator 155, see FIG. 8, consists of a differential amplifier, Q3A and Q3B, a constant current device, Q4, and an emitter follower, Q5. The differential amplifier Q3A–B is composed of two transistors within the same envelope. Similarly, the constant current device Q4 is composed of a temperature compensated Zener diode and a transistor. With no read command, the differential amplifier Q3A–B is adjusted for a mid-point of its range. The integrator 155 is held off by a normally heavily conducting transistor, or gate 153, clamping the input to ground 127. Upon receipt of a read command, line 70, blocking oscillator Q1 fires, producing a pulse which shuts off clamping transistor 153 and permits the integration of the input of tachometer 150, in line 151, for a duration equal to the pulse width of the blocking oscillator Q1. At the end of this pulse, the gate 153 automatically inhibits any further input in line 151 from tachometer 150 until the next read command.

The output of the gated integrator 177, FIG. 8, is a voltage proportional to the product of the velocity of the moving element 5 and time, where zero time occurs upon receipt of a read command signal, line 70.

Figure 9:
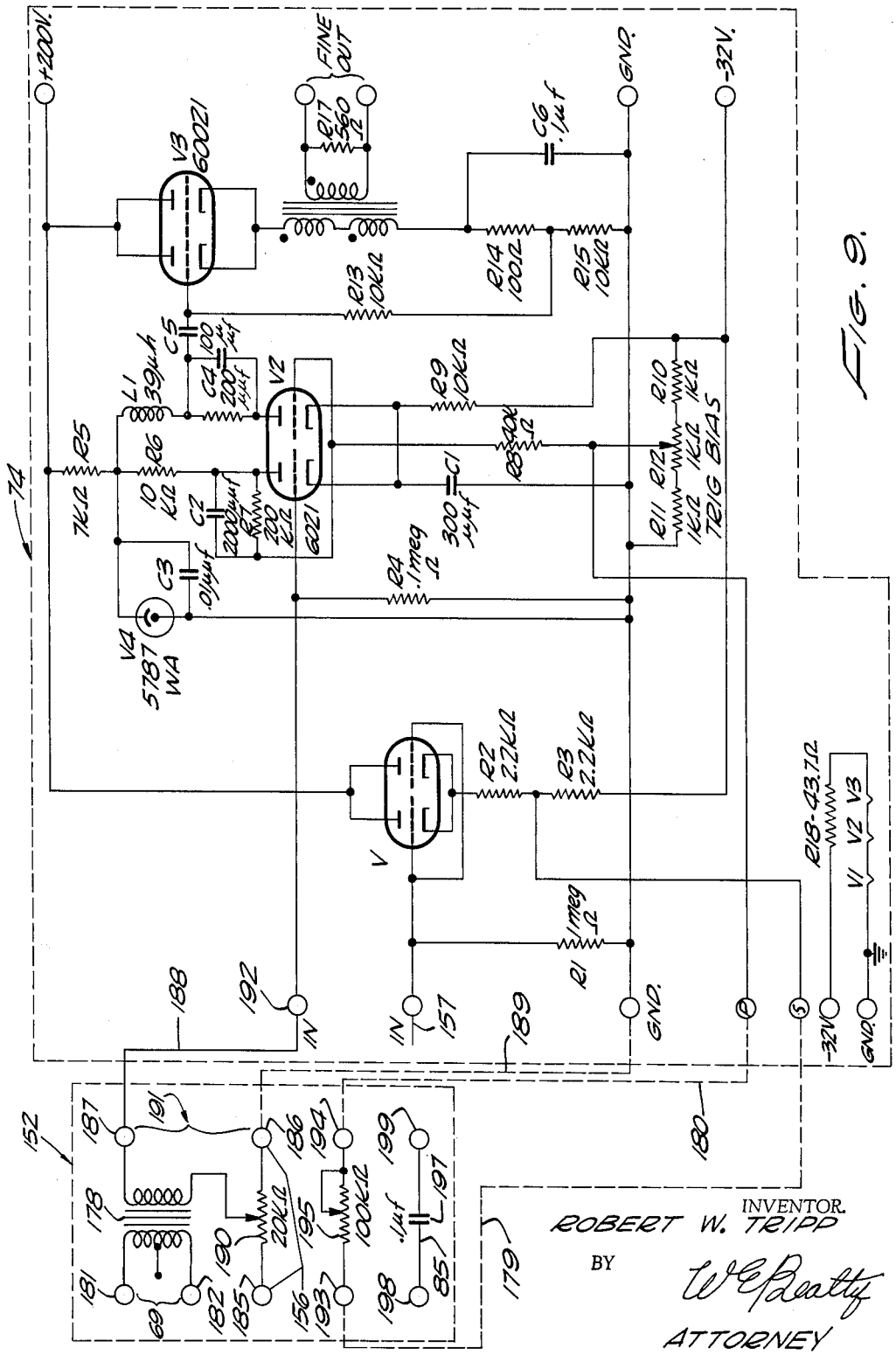
FIG. 9 is a schematic diagram of the mixer of FIGS. 3 and 6, and of the fine null cross detector of FIGS. 3 and 6.

The D.C. voltage output in line 156 of the gated integrator 177 is applied to the mixer 152, FIGS. 3 and 9, where it is used to bias the amplified signal from the data element 5. Since the latter signal is sinusoidal, the bias voltage will shift the zero crossing linearly for approximately $\pm \frac{1}{20}$ of a cycle of the data element 5. This range is more than adequate for compensating at normally encountered speeds. An extended range of compensation up to ¼ cycle can be furnished by modifying the linear output of gated integrator 177 to match the characteristic shape of the signal from the data element 5.

In FIGS. 8 and 9, the various capacitors and resistors, for example, may have the values indicated in the drawings.

FIGURE 9

A schematic circuit of the mixer 152 and of the null cross detector 74 is shown in FIG. 9.

Connections are made as follows:

The error signal from the EA, line 69, FIG. 3, is applied to the transformer 178 via terminals 181 and 182 at the left side of FIG. 9.

The high side of the signal from the integrator 155 in line 156, FIG. 3, is applied to terminal 185. The low side of the integrator signal line 156 is common with terminal 186 which is common to signal ground. In general, all lines of FIG. 3 are symbolic of a two-wire connection having a high side and a low side. The low side is understood to be common between connecting units. The 20K potentiometer 190 is used to adjust the gain of the output of integrator 155 to obtain the desired gain relationship between error signal in line 69 and correction signal in line 156. Thus, the integrator signal is algebraically added to the error signal. The combined output appears across terminals 187 and 186 represented by the single line 191, FIGS. 3 and 9.

Terminal 187, FIG. 9, is the high side of the output of mixer 152, and is applied to input terminal 192 of the null cross detector 74. Terminal 186 is the common ground connection indicated at 127 for the gated integrator 177, the mixer 152, and the null cross detector 74.

The signal taken directly from the tachometer 150 on line 157, FIG. 3, is connected to input terminal K, FIG. 9, of the null cross detector 74. Tube V1 is a cathode follower, having terminal S as an output. Terminal S of the null cross detector 74 is connected by line 179 to terminal 193 of the mixer 152. Terminal 194 of the mixer 152 is connected by line 180 to terminal P of the null cross detector 74. Thus, the 100K potentiometer 195 on the mixer 152 serves as a gain control for the tachometer signal in line 157. The mixer circuitry is separated from the null cross detector 74 only as a matter of convenience in system alignment.

The four lines, 179, 180, 188, 189 from the mixer to the null cross detector, are schematically shown as the two lines 191 and 196 in FIG. 3, and by the two lines 183 and 184 in FIG. 6.

The condenser 197 connected to terminals 198 and 199 in line 85 couples the output of the coarse error amplifier to its associated null cross detector 82. This equipment is used only to provide D.C. isolation between the two circuits. This is accomplished by either condenser coupling or transformer coupling and can properly be considered a part of the error amplifier. Its physical location, on the mixer board, with transformer 178 and potentiometers 190 and 195, in this instance, was a matter of engineering convenience only.

I claim:
1. An analog-digital converter comprising
   (a) a position-measuring transformer having
       (1) a variable mechanical analog input and
       (2) relatively movable members,
       (3) one of said members having polyphase windings,
       (4) another of said members having a single phase winding for supplying a phase-sensitive relative position signal;
   (b) a tachometer having as an input said variable mechanical analog input, said tachometer having an output signal proportional to the velocity of said input and having a sign related to the direction of motion of said input;
   (c) a clock pulse generator supplying pulses to
   (d) a frequency divider having an output of subharmonic frequency as an input to
   (e) a polyphase generator having as outputs
       (1) polyphase signals of different time phase for inputs to said polyphase windings and an output of
       (2) a reference signal as an input to
   (f) a first null crossing detector having an output of a
       (1) first control signal;
   (g) a second null crossing detector having inputs of
       (1) said phase-sensitive relative position signal and
       (2) said proportional signal from said tachometer, and having an output of
       (3) a second control signal;
   (h) a gate having inputs of
       (1) said clock pulses,
       (2) said first control signal and
       (3) said second control signal, and having an output of
       (4) a number of clock pulses representing a digital number corresponding to the time difference between the first control signal and the second control signal.
2. An analog-digital converter comprising
   (a) a first position measuring transformer having
       (1) a variable mechanical analog input and
       (2) relatively movable members,
       (3) one of said members having polyphase windings,
       (4) another of said members having a single phase winding for supplying a first phase-sensitive relative position signal;
   (b) a second position measuring transformer having
       (1) said mechanical analog input and
       (2) relatively movable members,

(3) one of said last-mentioned members having polyphase windings,
(4) another of said last-mentioned members having a single phase winding for supplying a second phase-sensitive relative position signal; the change in phase of said first phase-sensitive signal for a given change in said analog input being an integral multiple of the change in phase of the said second phase-sensitive signal produced by the same change in said analog input;
(c) a tachometer having as an input said variable mechanical input, said tachometer having an output signal proportional to the velocity of said input and having a sign related to the direction of motion of said input;
(d) a clock pulse generator supplying pulses to
(e) a frequency divider having an output of sub-harmonic frequency as an input to
(f) a polyphase generator having as outputs
   (1) a first signal for input to said first polyphase winding,
   (2) a second signal of different time phase for input to said second polyphase winding, and a
   (3) reference signal as an input to
(g) a first null crossing detector having an output of a first control signal;
(h) a second null crossing detector having inputs of
   (1) said first phase-sensitive relative position signal and
   (2) said proportional signal from said tachometer,
   (3) said second null crossing detector having an output of a second control signal;
(i) a third null crossing detector having
   (1) an input of said second phase-sensitive relative position signal and
   (2) an output of a third control signal;
(j) a first gate having inputs of
   (1) said clock pulses,
   (2) said first control signal and
   (3) said second control signal,
   (4) said first gate having an output of a first number of clock pulses representing a first digital number corresponding to the time difference between the first control signal and the second control signal,
(k) switching means having inputs of
   (1) an early train of clock pulses,
   (2) a later train of clock pulses, and
   (3) a signal proportional to said first digital number,
(l) said switching means having an output of
   (1) said early train of clock pulses when said first digital number is less than half of the range of said digital number, or
   (2) said later train of clock pulses when said first digital number is greater than half of said range of said first digital number,
(m) a second gate having inputs of
   (1) said early train or said late train of said clock pulses,
   (2) said first control signal and
   (3) said third control signal,
(n) said second gate having an output of a second number of clock pulses representing a second digital number corresponding to the time difference between the first control signal and the third control signal, a full range of said first digital number being equivalent to one count of said second digital number.

3. An analog-digital converter comprising
(a) position-measuring transformer having
   (1) a variable mechanical analog input and
   (2) relatively movable members,
   (3) one of said members having polyphase windings,
   (4) another of said members having a single phase winding supplying a phase-sensitive relative position signal;
(b) a tachometer having as an input said variable mechanical analog input, and having an output signal proportional to the velocity of said input and having a sign related to the direction of motion of said input;
(c) an integrator having as inputs
   (1) said proportional signal from said tachometer, and
   (2) a read command signal,
   (3) said integrator having an integrated signal that is the integral of said proportional signal with respect to time;
(d) a clock pulse generator supplying pulses to
(e) a frequency divider having an output of sub-harmonic frequency as an input to
(f) a polyphase generator having as outputs
   (1) polyphase signals of different time phase for inputs to said polyphase windings, and a
   (2) reference signal as an input to
(g) a first null crossing detector having
   (1) an output of a first control signal,
(h) a second null crossing detector having as inputs
   (1) said phase-sensitive relative position signal and
   (2) said proportional signal from said tachometer and
   (3) said integrated signal,
(i) said second detector having an output of a second control signal,
(j) a gate having inputs of
   (1) said clock pulses,
   (2) said first control signal and
   (3) said second control signal,
(k) said gate having an output of a number of clock pulses representing a digital number corresponding to the time difference between said first control signal and said second control signal.

4. An analog-digital converter comprising
(a) a position-measuring transformer having
   (1) a variable mechanical analog input and
   (2) relatively movable members,
   (3) one of said members having polyphase windings,
   (4) another of said members having a single phase winding supplying a phase-sensitive relative position signal;
(b) a second position-measuring transformer having
   (1) a second mechanical analog input and
   (2) relatively movable members,
   (3) one of said last-mentioned members having poly-phase windings,
   (4) another of said last-mentioned members having a single phase winding supplying a second phase-sensitive relative position signal; the change in phase of said first phase-sensitive signal for a given change in said analog input being an integral multiple of the change in phase of the said second phase-sensitive signal produced by the same change in said analog input;
(c) a tachometer having as an input said variable mechanical analog input and having an output signal proportional to the velocity of said input, said output signal having a sign related to the direction of motion of said input;
(d) an integrator having as inputs
   (1) said proportional signal from said tachometer, and
   (2) a read command signal,
(e) said integrator having as an output an integrated signal that is the integral of said proportional signal with respect to time;
(f) a clock pulse generator supplying pulses to (g) a frequency divider having an output of subharmonic frequency as an input to
(h) a polyphase generator having as outputs
   (1) a first signal for input to said first polyphase winding,
   (2) a second signal of different time phase for input to said second polyphase winding, and a
   (3) reference signal as an input to
(i) a first null crossing detector having an output of a
   (1) first control signal;
(j) a second null crossing detector having as inputs
   (1) said first-mentioned phase-sensitive relative position signal and
   (2) said proportional signal from said tachometer and
   (3) said integrated signal,
(k) said second detector having an output of a second control signal,
(l) a third null crossing detector having an input of
   (1) said second phase-sensitive relative position signal and an output of
   (2) a third control signal;
(m) a first gate having inputs of
   (1) said clock pulses,
   (2) said first control signal and
   (3) said second control signal,
(n) said first gate having an output of a first number of clock pulses representing a first digital number corresponding to the time difference between the first control signal and the second control signal,
(o) switching means having inputs of
   (1) an early train of clock pulses,
   (2) a later train of clock pulses, and
   (3) a signal proportional to said first digital number,
(p) said switching means having an output of
   (1) an early train of clock pulses when said first digital number is less than half of the range of said first digital number, or
   (2) said later train of clock pulses when said first digital number is greater than half of said range of said first digital number,
(q) a second gate having inputs of
   (1) said early train or said late train of said clock pulses,
   (2) said first control signal and
   (3) said third control signal,
(r) said second gate having an output of a second number of clock pulses representing a second digital number corresponding to the time difference between the first control signal and the third control signal, a full range of said first digital number being equivalent to one count of said second digital number.

5. An analog-digital converter according to claim 4, said first control signal as input to said second gate having delay means for establishing the phase of said first control signal out of synchronism with said early and late trains.

References Cited by the Examiner
UNITED STATES PATENTS 3,023,959   3/1962   Rabin et al. _____ 340—347

MALCOLM A. MORRISON, *Primary Examiner.*